United States Patent Office 3,301,798
Patented Jan. 31, 1967

3,301,798
POLYVINYL CHLORIDE FOAM
Raymond R. Waterman, Easton, and Donald C. Morris, Norwalk, Conn., assignors to R. T. Vanderbilt Company, Inc., New York, N.Y., a corporation of New York
No Drawing. Filed Apr. 16, 1963, Ser. No. 273,288
16 Claims. (Cl. 260—2.5)

The present invention pertains to a process for producing polyvinyl chloride foam, compositions for use therein and a versatile vinyl foam product produced thereby.

Polyvinyl chloride foam or sponge, whether open cell or closed cell, is produced from a plastisol by expanding or foaming the plastisol and then heating it to gell and fuse the expanded or cellular structure. The foam is generally produced by one of three methods. In the compressed gas method, a gas, such as carbon dioxide or nitrogen, is dissolved in the plastisol under pressure. Upon release of the pressure, the dissolved gas expands in the plastisol to form the plastisol into a closed cell vinyl sponge. A further process involves the use of chemical blowing agents which decompose in the plastisol to release a gas, such as nitrogen, within the plastisol to form the foam or sponge. The remaining major method for forming polyvinyl chloride foam involves the mechanical beating or frothing of a plastisol to incorporate air therein.

The major drawbacks to the compressed gas method are that it requires the use of comparatively expensive bottled gases, expensive refrigeration equipment for precise low temperature control and complicated high pressure machinery. The use of chemical blowing agents is disadvantageous, because these agents are expensive and the process is difficult to control. The present day mechanical beating process is unsatisfactory for light density foams, because the foamed plastisol tends to collapse prior to or during fusion thereof.

There has recently been developed a mechanical beating process for the production of polyvinyl chloride foam wherein there is no collapse of the foam so that the resulting foam has a fine, uniform, open cell structure. This process and product, which are dependent upon the presence of an alkali metal soap and water in the plastisol prior to the frothing or beating thereof to form the foam, have proved to be highly satisfactory. They could be improved, however, if some way could be found for increasing the tensile strength or tensile-density index (tensile strength per density) and varying the cell size either within or between foams.

The desirable improvement noted above is achieved by the present invention provided several critical factors are carefully observed. Thus, a certain critical amount of a blend of amine soap and alkali metal soap plus water must be present in the polyvinyl chloride plastisol prior to the frothing or beating thereof to form the foam. It was found that amine soap and alkali metal soap must be present in the plastisol prior to frothing or beating in order to provide a foam product having increased tensile strength or tensile-density index and controllably variable cell size, the amine soap and alkali metal soap being incorporated into the unfoamed plastisol either by mixing with the plastisol or the plasticizer, for example, by forming them in situ therein. The ingredients for forming the amine soap and alkali metal soap, namely a fatty acid, an amine and a saturated aqueous solution of an alkali metal soap-forming base, must be completely reacted before mechanical foaming of the plastisol. It was further found that the amount of water present in the plastisol must be kept at a low value in order to prevent the upsetting of the gelling and fusing of the foam and the ruining of the foam structure.

Accordingly, the present invention provides novel and highly useful polyvinyl chloride plastisols, a foam former or frothing aid for incorporation therein, a process for producing foam from the plastisol and the resulting foam product as more fully described and exemplified below.

A polyvinyl chloride plastisol is a dispersion of finely divided polyvinyl chloride resin particles in liquid plasticizer for the polyvinyl chloride resin. Typical useful plastisol grade or dispersion stir-in type polyvinyl chloride resins include Geon 121 (a high molecular weight polyvinyl chloride stir-in type plastisol resin sold by the B. F. Goodrich Chemical Company), Exon 654 (a similar resin sold by the Firestone Plastic Company), Marvinol VR–50 and VR–53 (general purpose polyvinyl chloride plastisol resins sold by the Naugatuck Chemical Company) and Opalon 410 (a polyvinyl chloride plastisol grade resin sold by the Monsanto Chemical Company). Where it is desired to reduce the fusing temperature, a portion, such as an amount up to about 30% by weight, of the vinyl chloride homopolymer resin can be replaced by or blended with a vinyl chloride copolymer plastisol resin, for example Geon 135 sold by the B. F. Goodrich Chemical Company.

The liquid plasticizer present in the plastisol as a dispersion medium for the polyvinyl chloride resin particles is used in varying amounts depending upon the nature of the plasticizer and the polyvinyl chloride resin. In general, the plasticizer is used in an amount from about 45 to aobut 350 parts by weight per 100 parts by weight of the polyvinyl chloride resin. Usually the plastisol will contain from about 54 to about 95 parts by weight of the plasticzer per 100 parts by weight of the polyvinyl chloride resin. Typical suitable plasticizers include dioctyl phthalate or di-(2-ethylhexyl) phthalate; butyl decyl phthalate; dicapryl phthalate; butyl benzyl phthalate; dioctyl adipate; dioctyl sebacate; tricresyl phosphate; trioctyl phosphate; cresyl diphenyl phosphate; acetyl tributyl citrate; dipropylene glycol dibenzoate; epoxy-type plasticizers, such as Monoplex S–73 (Rohm & Haas); polymeric plasticizer, such as Paraplex G–50 (Rohm & Haas); and butadiene-acrylonitrile copolymers, such as Hycar 1312 (B. F. Goodrich Chemical Company). Generally, these plasticizers are used in conjunction with one another to form composite plasticizer systems.

The choice of plasticizer should take into consideration its effect on plastisol rheology and its ability to held or release air. Experience has shown that a plastisol viscosity of 1500 to 10,000 cps. as measured on a Brookfield viscometer at 30 r.p.m. with a No. 4 spindle can be used satisfactorily in the process of the invention. Below this lower viscosity, the efficiency of the plastisol to hold air is reduced. Above this upper viscosity, the problem of transferring the plastisol is increased materially.

The plastisol used must have the property of thinning out with stirring. Using a Brookfield viscometer, flow properties can be checked by measurements at two spindle speeds. Thixotropic plastisols will show a reduction in viscosity at the higher spindle speed. Newtonian plastisols will give approximately equal readings at either speed. Both thixotropic and Newtonian plastisols are satisfactory for use in the process of the present invention. However, dilatant plastisols show an increase in viscosity at the higher spindle speed and are difficult to use in the process.

A good air release plasticizer required for many plastisol applications is not desirable for use in the present process, since the process of the invention functions by the mechanical entrapment of air in the plastisol. However, small amounts of excellent air release plasticizers can be used where specific properties are desired in the finished foam.

In addition to the dispersed phase, namely the plastisol grade polyvinyl chloride resin, and the dispersion medium, namely the liquid plasticizer, the polyvinyl chloride plastisols can contain, if desired, various conventional additives. Usually heat and light stabilizers are present which are lead, tin, zinc, cadmium and barium compounds or complexes, such as those stabilizers sold under the trade names Vanstay RZ 25, Vanstay HTA, Vanstay SA and Vanstay RR–Z (R. T. Vanderbilt Co.). The heat and light stabilizers are normally present in the plastisol in an amount from about 0.5 to about 6 parts by weight per 100 parts by weight of the polyvinyl chloride resin, and more usually in an amount from about 2 to about 4 parts by weight per 100 parts by weight of the polyvinyl chloride resin.

Fillers of the low oil absorption type are frequently employed in the plastisols to lower the cost of the finished foam and to modify its properties, typical fillers being calcium carbonate and talc or hydrous magnesium silicate. When fillers are employed in the plastisol, they are generally present in an amount up to about 10 parts by weight of the filler per 100 parts by weight of the polyvinyl chloride resin.

Where a colored or tinted polyvinyl chloride foam is desired, colorants or color-fast pigments are incorporated into the plastisol. The colorants or pigments will usually be present in the plastisol in an amount of about 1 part by weight per 100 parts by weight of the polyvinyl chloride resin.

Frequently the plastisols will contain organic nonsoap surfactants to serve as viscosity regulators. Typical organic nonsoap surfactants include the nonionic, anionic and cationic nonsoap surfactants, such as polyethylene glycol 400 monolaurate, a polyhydric alcohol ester sold by the Glyco Products Company; Ethomeen S-15, a tertiary amine ethylene oxide condensation product with primary fatty (soybean) amine sold by the Armour Company; Solar 25, a combination of coconut fatty acid amine condensate and a special type amine sulfonate sold by Swift and Company; and Igepal CO–630, a nonylphenoxypolyethoxy ethanol sold by Antara Chemicals. If used, these nonsoap surfactants or viscosity regulators are ordinarily present in the plastisol in an amount from about 0.25 to about 4 parts by weight per 100 parts by weight of the polyvinyl chloride resin.

As noted above, an essential component of the plastisol in accordance with the present invention is a blend or mixture of amine soap and alkali metal soap. This soap blend is present in the plastisol in an amount from about 2 to about 16 parts by weight per 100 parts by weight of the polyvinyl chloride resin. Neither soap is individually satisfactory, because the use of alkali metal soap alone produces foam products having reduced tensile strength or tensile-density index and substantially non-variable cell size while the use of amine soap alone produces foam products which have unduly collapsed and/or coarse cell structure.

The alkali metal soap is an alkali metal salt of a saturated or unsaturated fatty acid, including hydroxy fatty acids, or mixtures thereof having from 8 to 24 carbon atoms, and preferably having 18 carbon atoms. Typical examples thereof include the potassium and sodium salts of caprylic, capric, lauric, myristic, palmitic, stearic, oleic, linoleic, linolenic and ricinoleic acids. Potassium oleate is preferred. The alkali metal soap component of the soap blend is present in the plastisol in an amount of at least about 0.5 part by weight per 100 parts by weight of the polyvinyl chloride resin.

The amine soap is an amine salt of a saturated or unsaturated fatty acid, including hydroxy fatty acids, or mixtures thereof having from 8 to 24 carbon atoms, and preferably having 18 carbon atoms. Typical examples thereof include the ammonium, dimethylamine, triethanolamine and morpholine salts of caprylic, capric, lauric, myristic, palmitic, stearic, oleic, linoleic, linolenic and ricinoleic acids. Morpholine oleate is preferred. The amine soap component of the soap blend is present in the plastisol in an amount of at least about 1.5 parts by weight per 100 parts by weight of the polyvinyl chloride resin.

The soaps which serve as foam promoters or frothing aids and stabilize or prevent collapse of the foam for a sufficient time to allow it to be gelled and fused, must be present in the plastisol prior to beating or frothing thereof and hence cannot be added or formed in situ during or after frothing or foaming of the plastisol.

Water is present in the plastisol of the invention, because it aids in the production of a satisfactory foam and is needed as a medium for conveniently incorporating or blending the alkali metal soap per se or the alkali metal soap-forming base in making the foam former or frothing aid of the invention. The water content of the plastisol, however, must be kept to a low value, namely from about 0.2 to about 3.0 parts by weight per 100 parts by weight of the polyvinyl chloride resin. The presence of larger amounts of water in the plastisol injures the foam structure and upsets the gelation of the foam. Any water present in the plastisol has to be removed from the foam by heat and the evaporation of excessive amounts of water, particularly from thick sections of foam, tears up the air cells and destroys the foam structure.

Turning now to the liquid frothing aid or foam former of the invention, it is a blend (emulsion or dispersion) which comprises from about 2 to about 16 parts by weight of a soap blend and from about 0.2 to about 3.0 parts by weight of water, the soap blend being from about 3% to about 91% by weight of alkali metal soap and from about 97% to about 9% by weight of amine soap respectively. An amount up to about 4 parts by weight of a plasticizer described above may be present therein to lower the fluidity in those cases where the liquid is too thick to handle easily. If it is desired, there can be present therein from about 0.25 to about 4 parts by weight of an above mentioned organic nonsoap surfactant. The liquid composition generally also contains from about 0.5 to about 6, and preferably from about 2 to about 4, parts by weight of an above mentioned heat and light stabilizer.

The liquid frothing aid or foam former is used in the process of the invention by mixing from about 6 to about 30 parts by weight thereof with from about 45 to about 350, usually from about 54 to about 95, parts by weight of plasticizer and with about 100 parts by weight of a polyvinyl chloride resin in a high shear mixer to form a plastisol. The plastisol can be used immediately or, if desired, it can be stored up to seven weeks or even longer, because it has substantially constant gel-free flow characteristics during storage.

The plastisol is mechanically beaten or frothed to incorporate air therein by using a Hobart batch mixer or preferably an Oakes continuous mixer or similar equipment to form a liquid foam. Normal foaming temperature is from about 18° C. to about 35° C. After formation of the liquid foam into the desired shape by spreading or pouring into a mold, it is heated at a temperature from about 143° C. to about 185° C. for from about 30 seconds to about 4 hours to gel and fuse it. Gelation can be effected as a separate operation by heating at a temperature from about 60° C. to about 88° C. for from about 10 seconds to about 2 hours. During the gelation period the liquid foam containing discrete or closed air cells solidifies to a soft gel. Fusion can be obtained as a separate operation by further heating at a temperature from about 143° C. to about 185° C. for from about 20 seconds to about 4 hours. As fusion occurs, the discrete or closed cells become interconnecting or open cell and generally a semi-permeable skin forms on the foam. Radiofrequency or dielectric heating, radiant heat and circulating hot air heating are suitable for the gelling and fusing procedure. The temperature and time of heating, of course, will vary with the nature of the components present in the plastisol and the thickness and density of the foam. After heating, the fused foam is cooled to room temperature.

The compositions and process of the invention are illustrated by the following examples.

*Examples 1–4*

The materials set forth below were blended together at room temperature in the order listed with a Lightnin' Mixer having a marine type propeller to form phase stable liquid frothing aid or foam former emulsions A, B, C and D. The soap forming reaction is exothermic.

EMULSIONS

| Components | Parts by Weight | | | |
|---|---|---|---|---|
| | Emulsion A | Emulsion B | Emulsion C | Emulsion D |
| Oleic Acid | 7 | 7 | 7 | 7 |
| Butyl benzyl phthalate | 3.6 | 3.6 | | |
| Morpholine | 1.2 | 1.3 | 1.2 | 1.1 |
| Water | 0.6 | 0.5 | 0.5 | 0.6 |
| Potassium hydroxide (50% aqueous solution) | 0.6 | 0.6 | 0.4 | 0.7 |
| Total | 13.0 | 13.0 | 9.1 | 9.4 |

Emulsions A, B, C and D were cooled to room temperature and then separately blended with three or four plasticizers, an organic nonsoap surfactant in one case, a stabilizer and a vinyl chloride polymer dispersion resin in a Lightnin' Mixer equipped with a down thrust marine propeller blade until the batches were smooth and uniform to form the following plastisols A, B, C and D respectively:

PLASTISOLS

| Components | Parts by Weight | | | |
|---|---|---|---|---|
| | Plastisol A | Plastisol B | Plastisol C | Plastisol D |
| Dipropylene glycol dibenzoate (a plasticizer) | 46.5 | 46.5 | 46.5 | 46.5 |
| Dicapryl phthalate (a plasticizer) | 19.3 | 19.3 | 19.3 | 19.3 |
| Epoxy type plasticizer (Monoplex S-73) | 19.3 | 19.3 | 19.3 | 19.3 |
| Butyl benzyl phthalate (a plasticizer) | | | 3.9 | 3.1 |
| Nonylphenoxypolyethoxyethanol (Igepal CO-630, an organic nonsoap surfactant) | | | | 0.5 |
| Vanstay HTA (a heat and light stabilizer which is a complex mixture of barium and cadmium compounds of the R. T. Vanderbilt Co., Inc.) | 2 | 2 | 2 | 2 |
| Polyvinyl chloride dispersion resin (Exon 654) | 100 | 100 | 100 | |
| Polyvinyl chloride dispersion resin (Geon 121) | | | | 100 |
| Emulsion A (above) | 13 | | | |
| Emulsion B (above) | | 13 | | |
| Emulsion C (above) | | | 9.1 | |
| Emulsion D (above) | | | | 9.4 |
| Total | 200.1 | 200.1 | 200.1 | 200.1 |

The resulting plastisols A, B, C and D were separately foamed in a 10–M Oakes mixer at a pump throughput of 0.75 lb./min., a rotor speed of 100 r.p.m., incorporating air so that a back pressure of 45 p.s.i. was obtained. The foams were delivered through 12 feet of ½" internal diameter flexible tubing plus 3 feet of ¾" internal diameter flexible tubing. The foams were spread on release paper or bleached muslin in layers 3/16" thick, gelled and fused between 2–24" x 24" radiant heat panels, rated at 3750 watts at 230 volts, operating at 110 volts for approximately 2 minutes, and then cooled to room temperature to form vinyl foams A, B, C and D.

*Examples 5–11*

These examples illustrating the utilization of various other amine soaps in the soap blend were run in accordance with the entire procedure set forth in Examples 1–4 except as noted below.

EMULSIONS

| Components | Parts by Weight | | | | | | |
|---|---|---|---|---|---|---|---|
| | Emulsion E | Emulsion F | Emulsion G | Emulsion H | Emulsion I | Emulsion J | (No Emulsion) |
| Butyl benzyl phthalate | 3.7 | 2.6 | 1.3 | | | | |
| Oleic acid | 7 | 7 | 7 | | | | |
| Linoleic acid | | | | 7 | | | |
| Neo-fat 42-12 [1] | | | | | | 7 | |
| Caprylic acid | | | | | 7 | | |
| Dimethylamine (40%) | | 2.3 | | | | | |
| Triethanolamine | | | 2.8 | | | | |
| Morpholine | | | | 1.7 | 3.7 | 1.4 | |
| Ammonia (28%) | 1.2 | | | | | | |
| KOH (50% solution) | 0.6 | 0.6 | 0.6 | 0.6 | 0.8 | 0.6 | |
| Nonylphenoxypolyethoxyethanol (Igepal) | 0.5 | | | | | | |
| Water | | | 0.8 | 0.7 | 0.7 | 0.7 | |
| Total | 13.0 | 12.5 | 12.5 | 10.0 | 12.2 | 9.7 | |

[1] Neo-fat 42-12 is fractionated tall oil comprising oleic acid 46%, linoleic acid 39%, linolenic acid 3% and rosin acids 12% (Armour and Co.).

PLASTIOSOLS

| Components | Parts by Weight | | | | | | |
|---|---|---|---|---|---|---|---|
| | Plastisol E | Plastisol F | Plastisol G | Plastisol H | Plastisol I | Plastisol J | Plastisol K |
| Butyl benzyl phthalate | | | | 2.5 | 0.3 | 2.8 | |
| Dipropylene glycol dibenzoate | 46.4 | 46.4 | 46.4 | 46.4 | 46.4 | 46.4 | 47.7 |
| Dicapryl phthalate | 19.3 | 19.3 | 19.3 | 19.3 | 19.3 | 19.3 | 20 |
| Epoxy type plasticizer (Monoplex S-73) | 19.3 | 19.3 | 19.3 | 19.3 | 19.3 | 19.3 | 20 |
| Stearic acid | | | | | | | 7 |
| Dimethylamine (40%) | | | | | | | 2.2 |
| KOH (50% solution) | | | | | | | 0.6 |
| Vanstay HTA | 2 | 2 | 2 | 2 | 2 | 2 | 2 |
| Nonylphenoxypolyethoxy ethanol (Igepal Co-630) | | 0.5 | 0.5 | 0.5 | 0.5 | 0.5 | 0.5 |
| Geon 121 resin | 100 | 100 | 100 | 100 | 100 | 100 | 100 |
| Emulsion (from above) | 13 | 12.5 | 12.5 | 10 | 12.2 | 9.7 | |
| Total | 200 | 200 | 200 | 200 | 200 | 200 | 200 |

Plastisol K differs from the formulations containing added emulsions in that the soaps are formed in situ in the entire quantity of plasticizer, mixing the first six ingredients at 170° F., and cooling to room temperature before adding the last three components. Plastisol I was kept at 28 p.s.i. head pressure while incorporating air.

PROPERTIES OF VINYL FOAM PRODUCTS

| | Foam E | Foam F | Foam G | Foam H | Foam I | Foam J | Foam K |
|---|---|---|---|---|---|---|---|
| Density (pounds/cu. ft.) | 26.7 | 26.7 | 24.5 | 20.0 | 23.0 | 20.1 | 23.0 |
| Tensile (pounds/sq. in.) | 236.9 | 248.8 | 154.3 | 73.0 | 73.0 | 83.5 | 176.3 |
| Elongation (percent) | 160 | 170 | 160 | 110 | 70 | 120 | 160 |
| Tensile-Density Index | 8.89 | 9.32 | 6.30 | 3.65 | 3.18 | 4.15 | 7.67 |

Examples 12–13

A vinyl foam made with potassium oleate was compared with one in which approximately half of the potassium oleate had been replaced with morpholine oleate. The plastisols L and M were made by blending the ingredients in the order listed using a Lightnin' Mixer with a down thrust marine propeller.

| Ingredient | Plastisol L | Plastisol M |
|---|---|---|
| Dipropylene glycol dibenzoate | 46.4 | 46.4 |
| Dicapryl phthalate | 19.3 | 19.3 |
| Epoxy-type plasticizer (Monoplex S-73) | 19.3 | 19.3 |
| Vanstay HTA stabilizer | 2 | 2 |
| Nonylphenoxypolyethoxy ethanol | 0.5 | 0.5 |
| Geon 121 resin | 100 | 100 |

The following emulsion was made by blending the ingredients in the order listed using a Lightnin' Mixer equipped with a down thrust marine propeller blade. The reaction is exothermic so that the emulsion was cooled to room temperature before adding to the plastisol above.

| Ingredient | Plastisol L | Plastisol M |
|---|---|---|
| Butyl benzyl phthalate | 3 | 1.6 |
| KOH (50% solution) | 2.7 | 1.4 |
| Oleic acid | 6.8 | 3.5 |

The following emulsion was made by blending the ingredients in the order listed using a Lightnin' Mixer equipped with a down thrust marine propeller blade. The reaction is exothermic so that the emulsion was cooled to room temperature before adding to the plastisol above.

| Ingredient | Plastisol L | Plastisol M |
|---|---|---|
| Oleic acid | | 3.5 |
| Morpholine | | 1.1 |
| Water | | 0.3 |
| Butyl benzyl phthalate | | 1.1 |
| Total | 200 | 200 |

The resulting plastisols L and M were separately foamed in a 10-M Oakes Mixer at a pump throughput of 0.75 lb./min., a rotor speed of 100 r.p.m., varying the amount of air incorporated so that the densities shown below were obtained. The foams were delivered through 14 feet of ⅝" internal diameter plus 4 feet of ¾" internal diameter flexible polyethylene tubing. The foams were spread on release paper or bleached muslin in layers ³⁄₁₆" thick, gelled and fused between 2–24" x 24" radiant heat panels, rated at 3750 watts at 230 volts, operating at 110 volts for approximately 2 minutes, and then cooled to room temperature. Tensile data were obtained by conventional methods.

| | Foam L | Foam M |
|---|---|---|
| Density (pounds/cubic foot) | 10.2 | 9.8 | 13.2 |
| Tensile (pounds/square inch) | 30.2 | 35.0 | 50.5 |
| Elongation (percent) | 170 | 170 | 160 |
| Tensile-Density Index | 2.96 | 3.59 | 3.83 |

Vinyl foams A through K and M of the invention prepared by utilizing a blend of alkali metal soap and amine soap had higher tensile strength (35 to 248.8) and higher tensile-density index (3.18 to 9.32) than the tensile strength (30.2) and tensile-density index (2.96) of comparative vinyl foam L prepared by using alkali metal soap alone. Moreover, while comparative foam L had a uniform fine spheroidal cell structure and no surface skin, the vinyl foams of the invention had cell structures which were controllably varied either within or between the foams and generally had a surface skin. Thus the foams of the invention generally had ellipsoidal shaped cells of varying major diameter, for example, 30 microns for foam J, 40 microns for foams A and B, 45 microns for foam E, and 225 microns for foam M. The versatility of the invention is further shown by foams C and H wherein the interior of the foam contained larger cells than the surrounding portions and by foam K wherein the opposite relationship was present.

The open cell vinyl foam product of the invention ranges in hand from soft to firm and harsh to the touch. Color retention and aging characteristics are excellent. Inorganic acids and alkalis have no damaging effects. The vinyl foam product is resistant to swelling in oils, alcohols and aliphatic hydrocarbons. Greases will not attack it. Flame resistance can be obtained by selection of the proper plasticizer in the plastisol formulation. Foam adhesion to cotton, rayon, and nylon is excellent.

Uses include padding for brassieres or insulation in a variety of wearing apparel applications ranging from comfortable, long lasting shoe linings and shoe insoles to simulated smooth and suede leather and weather shielding headwear. Uses as a cushioning and upholstery material include public seating in buildings, airplanes, buses, and subway or railway cars where flame resistance may be a required property. Good outdoor aging characteristics reveal its utility in equipment for patios, swimming pools, stadium cushions, and camping equipment. In fabricating articles for such applications, a non-porous plastisol coating may be deposited on the surface of the form before addition of the foamed material. Upon fusion, the protective non-porous skin adheres firmly to the underlying semi-permeable skin of the cellular structure.

Additional uses including safety padding for automotive, factory and sports use, sound insulation for automotive use, insulation of bridges against frost, and for gaskets.

It will be appreciated that various modifications and changes may be made in the invention in addition to those described above without departing from the spirit thereof and accordingly the invention is to be limited only within the scope of the appended claims.

What is claimed is:

1. An unfoamed plastisol especially adapted for the formation of an open cell polyvinyl chloride foam by the incorporation of air therein which comprises about 100 parts by weight of polyvinyl chloride resin particles dispersed in from about 45 to about 350 parts by weight of plasticizer therefor, from about 2 to about 16 parts by weight of a soap blend consisting of at least about 0.5 part by weight of alkali metal soap and at least 1.5 parts by weight of amine soap, and from about 0.2 to about 3.0 parts by weight of water, said alkali metal soap being selected from the group consisting of alkali metal salts of saturated and unsaturated fatty acids, including hydroxy fatty acids, and mixtures thereof having from 8 to 24 carbon atoms and said amine soap being selected from the group consisting of amine salts of saturated and unsaturated fatty acids, including hydroxy fatty acids, and mixtures thereof having from 8 to 24 carbon atoms.

2. A plastisol as defined by claim 1 which further contains from about 0.5 to about 6 parts by weight of a heat and light stabilizer for polyvinyl chloride resin.

3. A plastisol as defined by claim 1 which further contains from about 0.25 to about 4 parts by weight of organic nonsoap surfactant.

4. An unfoamed plastisol especially adapted for the formation of an open cell polyvinyl chloride foam by the incorporation of air therein which comprises about 100 parts by weight of polyvinyl chloride resin particles dispersed in from about 54 to about 95 parts by weight of plasticizer therefor, from about 2 to about 16 parts by weight of a soap blend consisting of at least about 0.5 part by weight of potassium oleate and at least about 1.5 parts by weight of morpholine oleate, and from about 0.2 to about 3.0 parts by weight of water.

5. A plastisol as defined by claim 4 which further contains from about 2 to about 4 parts by weight of a heat and light stabilizer for polyvinyl chloride resin.

6. A plastisol as defined by claim 4 which further contains from about 0.25 to about 4 parts by weight of organic nonsoap surfactant.

7. A liquid frothing aid or foam former especially adapted for promoting foam formation and preventing collapse thereof by the incorporation of air into an unfoamed polyvinyl chloride plastisol containing said liquid which comprises a blend of from about 2 to about 16 parts by weight of a soap blend and from about 0.2 to about 3.0 parts by weight of water, the soap blend consisting of from about 3% to about 91% by weight of alkali metal soap and from about 97% to about 9% by weight of amine soap respectively; said alkali metal soap being selected from the group consisting of alkali metal salts of saturated and unsaturated fatty acids, including hydroxy fatty acids, and mixtures thereof having from 8 to 24 carbon atoms and said amine soap being selected from the group consisting of amine salts of saturated and unsaturated fatty acids, including hydroxy fatty acids, and mixtures thereof having from 8 to 24 carbon atoms.

8. The liquid product as defined by claim 7 which further contains an amount up to about 4 parts by weight of a plasticizer for polyvinyl chloride resin.

9. The liquid product as defined by claim 7 which further contains from about 0.5 to about 6 parts by weight of a heat and light stabilizer for polyvinyl chloride resin.

10. The liquid product as defined by claim 7 wherein said alkali metal soap is potassium oleate and wherein said amine soap is morpholine oleate.

11. A process for producing an open cell polyvinyl chloride foam which comprises mixing together about 100 parts by weight of polyvinyl chloride resin particles, from about 45 to about 350 parts by weight of plasticizer therefor, from about 2 to about 16 parts by weight of a soap blend consisting of at least about 0.5 part by weight of alkali metal soap and at least about 1.5 parts by weight of amine soap, and from about 0.2 to about 3.0 parts by weight of water to form a plastisol; said alkali metal soap being selected from the group consisting of alkali metal salts of saturated and unsaturated fatty acids, including hydroxy fatty acids, and mixtures thereof having from 8 to 24 carbon atoms and said amine soap being selected from the group consisting of amine salts of saturated and unsaturated fatty acids, including hydroxy fatty acids, and mixtures thereof having from 8 to 24 carbon atoms; mechanically beating or frothing air into the plastisol to form a liquid foam; shaping the liquid foam; heating the liquid foam to gel and fuse it; and cooling the fused foam to room temperature.

12. The process as defined by claim 11 wherein said plastisol further contains from about 0.5 to about 6 parts by weight of a heat and light stabilizer for polyvinyl chloride resin.

13. The process as defined by claim 11 wherein said plastisol further contains from about 0.25 to about 4 parts by weight of organic nonsoap surfactant.

14. The process for producing an open cell polyvinyl chloride foam which comprises mixing together about 100 parts by weight of polyvinyl chloride resin particles, from about 54 to about 95 parts by weight of plasticizer therefor and from about 6 to about 30 parts by weight of a liquid frothing aid blend comprising from about 2 to about 16 parts by weight of a soap blend and from about 0.2 to about 3.0 parts by weight of water, said soap blend consisting of from about 3% to about 91% by weight of alkali metal soap and from about 97% to about 9% by weight of amine soap respectively, to form a plastisol; said alkali metal soap being selected from the group consisting of alkali metal salts of saturated and unsaturated fatty acids, including hydroxy fatty acids, and mixtures thereof having from 8 to 24 carbon atoms and said amine soap being selected from the group consisting of amine salts of saturated and unsaturated fatty acids, including hydroxy fatty acids, and mixtures thereof having from 8 to 24 carbon atoms; mechanically beating or frothing air into the plastisol to form a liquid foam; shaping the liquid foam; heating the liquid foam at a temperature from about 143° C. to about 185° C. for from about 30 seconds to about 4 hours to gel and fuse it; and cooling the fused foam to room temperature.

15. The process as defined by claim 14 wherein said alkali metal soap is potassium oleate and wherein said amine soap is morpholine oleate.

16. The process as defined by claim 14 wherein the heating step is a two-stage operation, namely heating the liquid foam at a temperature from about 60° C. to about 88° C. for from about 10 seconds to about 2 hours to gel it and further heating the gelled foam at a temperature from about 143° C. to about 185° C. for from about 20 seconds to about 4 hours to fuse it.

References Cited by the Examiner

UNITED STATES PATENTS 2,925,397  2/1960  Hopfner _____ 260—29.6
2,966,470  12/1960 Maltenfort _____ 260—2.5

OTHER REFERENCES

Schwartz et al.: "Surface Active Agents and Detergents," vol. II, pp. 136, 137.

MURRAY TILLMAN, *Primary Examiner.*

N. F. OBLON, *Assistant Examiner.*